US010942133B2

(12) United States Patent
Wong (10) Patent No.: US 10,942,133 B2
(45) Date of Patent: Mar. 9, 2021

(54) METHOD AND SYSTEM FOR AUTOMATICALLY DETECTING FABRIC DEFECT, AND COMPUTER READABLE STORAGE MEDIUM

(71) Applicant: THE HONG KONG RESEARCH INSTITUTE OF TEXTILES AND APPAREL LIMITED, Hong Kong (CN)

(72) Inventor: Wai Keung Wong, Hong Kong (CN)

(73) Assignee: THE HONG KONG RESEARCH INSTITUTE OF TEXTILES AND APPAREL LIMITED, Hong Kong (CN)

( * ) Notice: Subject to any disclaimer, the term of this patent is extended or adjusted under 35 U.S.C. 154(b) by 0 days.

(21) Appl. No.: 16/611,183

(22) PCT Filed: Apr. 11, 2018

(86) PCT No.: PCT/CN2018/082661
§ 371 (c)(1),
(2) Date: Nov. 5, 2019

(87) PCT Pub. No.: WO2018/214661
PCT Pub. Date: Nov. 29, 2018

(65) Prior Publication Data
US 2020/0158659 A1    May 21, 2020

(30) Foreign Application Priority Data
May 24, 2017   (CN) .......................... 201710373868.X (51) Int. Cl.
*G01N 21/898*    (2006.01)
*H04N 13/254*    (2018.01)
(Continued)

(52) U.S. Cl.
CPC ....... *G01N 21/8983* (2013.01); *H04N 13/239* (2018.05); *H04N 13/254* (2018.05);
(Continued)

(58) Field of Classification Search
CPC ....... G01N 21/8983; G01N 2021/8861; G01N 2021/888; H04N 13/254; H04N 13/239
(Continued)

(56) References Cited

U.S. PATENT DOCUMENTS 4,124,300 A * 11/1978 Mead ...................... D06H 3/08
250/559.01
5,087,822 A *  2/1992 Fairlie ................ G01N 21/8903
250/559.16
(Continued)

FOREIGN PATENT DOCUMENTS

CN    101191774 A    6/2008
CN    101587082 A    11/2009
(Continued)

OTHER PUBLICATIONS

Office Action received in Chinese Application No. 201710373868.X dated Jun. 1, 2020.
(Continued)

*Primary Examiner* — Roy M Punnoose
(74) *Attorney, Agent, or Firm* — Dorsey & Whitney LLP (57) ABSTRACT

Disclosed are a method and system for automatic detection of a fabric defect. The method comprises: preprocessing a region of a fabric to be detected during a fabric transmission process by a noise removing device to eliminate noise interference during a detection process; triggering a camera to perform image acquisition on the fabric to be detected according to rotation information of a motor of a roller of a
(Continued)

cloth inspection machine; and automatically identifying a defect on the fabric to be detected based on an acquisition image.

20 Claims, 4 Drawing Sheets (51) Int. Cl.
*H04N 13/239* (2018.01)
*G01N 21/88* (2006.01)

(52) U.S. Cl.
CPC .............. *G01N 2021/888* (2013.01); *G01N 2021/8861* (2013.01)

(58) Field of Classification Search
USPC ........................................... 356/430
See application file for complete search history.

(56) References Cited

U.S. PATENT DOCUMENTS

| | | | | |
|---|---|---|---|---|
| 5,870,204 A | * | 2/1999 | Chiu | ............... G01N 21/8903 356/430 |
| 2001/0012381 A1 | | 8/2001 | Sari-sarraf et al. | |
| 2002/0166970 A1 | * | 11/2002 | Komulainen | ........ D21G 9/0036 250/340 |
| 2005/0211817 A1 | * | 9/2005 | Muench | ................ B65H 26/00 242/416 |
| 2009/0060316 A1 | * | 3/2009 | Ruuska | ................ B65H 26/025 382/141 |
| 2010/0110173 A1 | * | 5/2010 | Kagawa | ............... G01N 33/367 348/88 |
| 2019/0153672 A1 | * | 5/2019 | Shitara | ............... G01B 11/0691 |

FOREIGN PATENT DOCUMENTS

| | | |
|---|---|---|
| CN | 103207186 A | 7/2013 |
| CN | 203688459 U | 7/2014 |
| CN | 204575549 U | 8/2015 |
| CN | 204882397 U | 12/2015 |
| CN | 205786382 U | 12/2016 |

OTHER PUBLICATIONS

International Search Report andWritten Opinion received in PCT Application No. PCT/CN2018/082661 , dated Nov. 1, 2019, (Engl. Translation of ISR only).

\* cited by examiner

Fig. 4

METHOD AND SYSTEM FOR AUTOMATICALLY DETECTING FABRIC DEFECT, AND COMPUTER READABLE STORAGE MEDIUM

CROSS-REFERENCE TO RELATED APPLICATION

This application is based upon and claims priority to PCT patent application No. PCT/CN2018/082661, filed on Apr. 11, 2018, which is based upon and claims priority to Chinese Patent Application No. 201710373868.X, filed on May 24, 2017, the entire content of which is incorporated herein by reference for all purposes.

TECHNICAL FIELD

The present disclosure relates to textile industry detection technology, and more particularly, to a method and a system for automatically detecting fabric defect and a computer readable storage medium.

BACKGROUND

For a long time, in the textile industry, the quality of incoming cloths (further referred to herein as fabrics) is directly related to a subsequent cutting process and garment quality. Almost all garment factories currently rely on naked eyes of staffs to inspect the incoming cloths. Due to the large amount of incoming cloths, garment factories generally assemble at least one cloth inspection machine, and one cloth inspection machine requires at least one operator. During a cloth inspecting process, once cloth defects are found, the operator will stop the machine to confirm and make a paper recording and a defect marking at the same time. Due to limitations of human eyes, the speed of manual inspection is generally slow. If the speed of the cloth inspection machine is too fast, more missed inspections may be inevitably occurred, which may affect the accuracy of objective scoring and grade evaluation of the cloth. On the other hand, due to the repeatability and strength of a cloth inspecting operation, a long-term inspecting process may cause visual fatigue of the operator, thereby resulting in occurring of more missed inspections, and the longer the operator works, the greater the probability of missed inspections is.

Therefore, a device for automatic detection and marking fabric defects in real time and accurately is needed.

SUMMARY

Embodiments of the present disclosure provide a method and a system for automatically detecting fabric defect and a computer readable storage medium.

According to a first aspect of the present disclosure, there is provided a method for automatically detecting fabric defect, including: preprocessing a region of a fabric to be detected during a fabric transmission process by a noise removing device to eliminate noise interference during a detection process; triggering a camera to perform image acquisition on the fabric to be detected according to rotation information of a motor of a roller of a cloth inspection machine; and automatically identifying a defect on the fabric to be detected based on an acquisition image. When the defect is identified, a rotational speed of the motor of the roller of the cloth inspection machine may be adjusted to reduce a fabric transmission speed; a position of a detected defect is marked on the fabric by a defect marking device.

The automatically identifying the defect on the fabric to be detected further includes, performing a defect image stitching on the defect which is spanned two or more adjacent images.

In the method, it further includes, obtaining a position of a global coordinate of the defect in overall fabric, which comprises: obtaining a local coordinate of the defect on an sampling picture, a size of a defect region, a length of the defect, and a direction of the defect; obtaining a global vertical coordinate of the defect in the overall fabric according to the rotation information of the motor of the roller of the cloth inspection machine; obtaining a global horizontal coordinate of the defect in the overall fabric according to a number of cameras corresponding to the sampling picture; and accurately marking a position of the defect according to the position of the global coordinate of the defect in the overall fabric.

The marking the position of the defect further includes: according to the position of the global coordinate of the defect in the overall fabric, controlling the defect marking device to locate an edge of the fabric corresponding to an identified defect, and marking the edge of the fabric without translating the defect marking device.

Further, the noise removing device used in the method of the present disclosure may include a blowing device and a cleaning device.

The method of the present disclosure further includes, grading and scoring the defect according to the characteristics of the defect which comprises, but not limited to, the length of the defect, the size of the defect region, the direction of the defect, a unit code length density at which the defect is occurred.

Identified information of the defect of the fabric may be stored. Stored defect information includes but not limited to a defect grade, a defect point, a local coordinate of the defect, a global coordinate of the defect, a storage path of an original image, a storage path of a defect detection image, an overall detection score of the fabric, a detection code length of the fabric, and an average score of a unit code length, etc.

Finally, a detection report of the fabric to be inspected is automatically generated and output.

According to a second aspect of the present disclosure, a system for automatically detecting fabric defect is provided, including: a noise removing device, configured to preprocess a region of a fabric to be detected during a fabric transmission process to eliminate noise interference during a detection process; a camera, configured to be triggered to perform image acquisition on the fabric to be detected according to rotation information of a motor of a roller of a cloth inspection machine; and a defect recognition device, configured to automatically identifying a defect on the fabric to be detected based on an acquisition image. The system of the present disclosure may further include a defect marking device, when the defect marking device identifies the defect, configured to decrease a rotation speed of the motor of the roller of the cloth inspection machine to reduce a fabric transmission speed, and mark a position of the detected defect on the fabric by a defect marking device.

The defect recognition device is further configured to perform a defect image stitching on the defect which is spanned two or more adjacent images.

In the system, the defect recognition device is further configured to obtain a position of a global coordinate of the defect in overall fabric, by obtaining a local coordinate of the defect on an sampling picture, a size of a defect region, a length of the defect, and a direction of the defect; obtain a global vertical coordinate of the defect in the overall fabric according to the rotation information of the motor of the roller of the cloth inspection machine; obtain a global horizontal coordinate of the defect in the overall fabric according to a number of cameras corresponding to the sampling picture; and the defect marking device accurately marks a position of the defect according to the position of the global coordinate of the defect in the overall fabric.

The defect marking device further locates an edge of the fabric corresponding to an identified defect according to the position of the global coordinate of the defect in the overall fabric, and marks the edge of the fabric without translating the defect marking device at the same time.

Further, the noise removing device in the system of the present disclosure may include a blowing device and a cleaning device.

The system of the present disclosure further includes a defect grading device, configured to grade and score the defect according to the characteristics of the defect which comprises, but not limited to, the length of the defect, the size of a defect region, the direction of the defect, a unit code length density at which the defect is occurred.

The system of the present disclosure may further include a database, configured to store information on the identified defect of the fabric, the stored defect information includes but not limited to a defect level, a defect point, a local coordinate of the defect, a global coordinate of the defect, a storage path of an original image, a storage path of a defect detection image, an overall detection score of the fabric, a detection code length of the fabric, and an average score of a unit code length, etc.

Finally, the system further includes a detection reporting device, configured to automatically generate and output a detection report of the fabric to be detected.

According to a third aspect of the present disclosure, there is provided a fabric defect automatic detection device, including a memory and a controller, wherein the controller is configured to perform the method as described above.

According to a fourth aspect of the present disclosure, there is provided a computer readable storage medium having a computer program stored thereon, wherein the computer program is executed to implement the method as described above.

It should be understood that the above general description and the following detailed description are merely exemplary, which are not limited to the present disclosure.

BRIEF DESCRIPTION OF THE DRAWINGS

Exemplary embodiments of the present disclosure will be described in detail below with reference to accompanying drawings, the above and other objects, features and advantages of the present disclosure may become more apparent.

DETAILED DESCRIPTION

Exemplary embodiments of the present disclosure will now be described more fully with reference to accompanying drawings. It should be understood that the exemplary embodiments herein are provided to assist in the understanding of the disclosure and are not intended to limit the disclosure in any way. The embodiments are provided to make the description of the present disclosure more comprehensive and complete, and to transmit the concept of the exemplary embodiments to those skilled in the art. The drawings are only schematic representations of the disclosure, and are not necessarily to scale. The same reference numerals in the drawings denote the same or similar parts, and the repeated description thereof will be omitted.

Further, described features, structures, or advantages may be combined in any suitable manner in one or more embodiments. In the following description, numerous specific details are provided to give a full understanding of the embodiments of the present disclosure. However, one skilled in the art may appreciate that one or more of the specific details may be omitted while practicing technical solutions of the present disclosure, or using other equivalent methods, methods, apparatuses and steps to substitute. For sake of brevity, structures, methods, apparatus, implementations or operations well known in the art will not be described again.

In recent years, some automatic detection technologies have been proposed in the industry. For example, defect detection is performed by photographing from various angles with a video camera. However, since noises are present on the photographed cloth (such as fibers, yarn breakages, dusts, etc.), and an existing system does not provide a device for eliminating noise interference. The noise may greatly reduce the detection accuracy. In addition, some related arts have proposed the technology of using orthogonal wavelet transform detection algorithms to detect defects. However, since a computational cost of this algorithm is very high, real-time detection may not be achieved.

Figure 1:
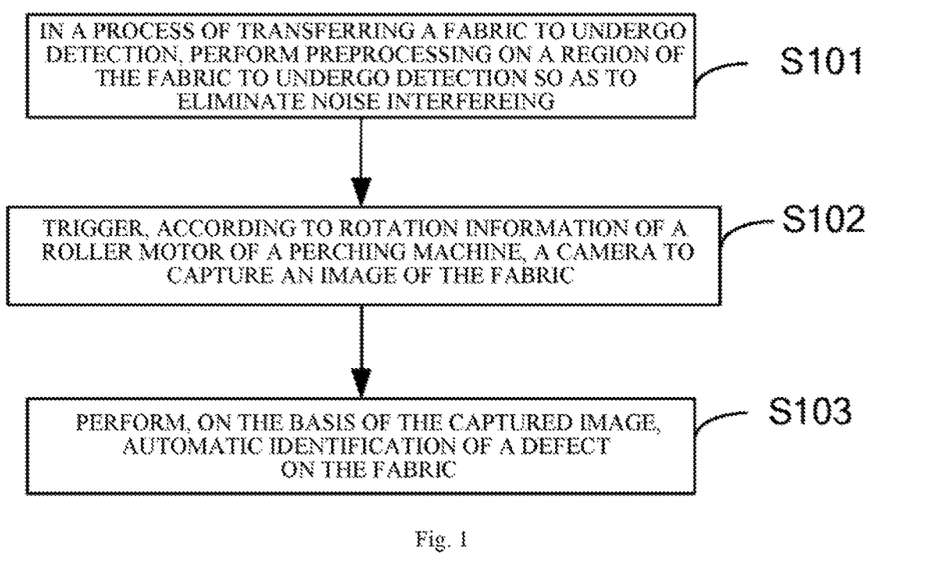
FIG. 1 is a flowchart of a method for automatically detecting fabric defect according to an embodiment of the present disclosure.

FIG. 1 is a flowchart of a method for automatically detecting fabric defect according to an embodiment of the present disclosure. As shown in the figure, the method mainly includes: step S101, a region of a fabric to be detected is preprocessed during a fabric transmission process by a noise removing device. Noise interference is eliminated during a detection process. Next, in step S102, according to rotation information of a roller motor of a cloth inspection machine, a camera is triggered to perform image acquisition of fabric to be detected; then, in step S103, based on an acquisition image, defects on the fabric to be detected are automatically identified. Based on the above method, the automatic detection and recognition of the defects of the fabric may be completed.

Figure 2:
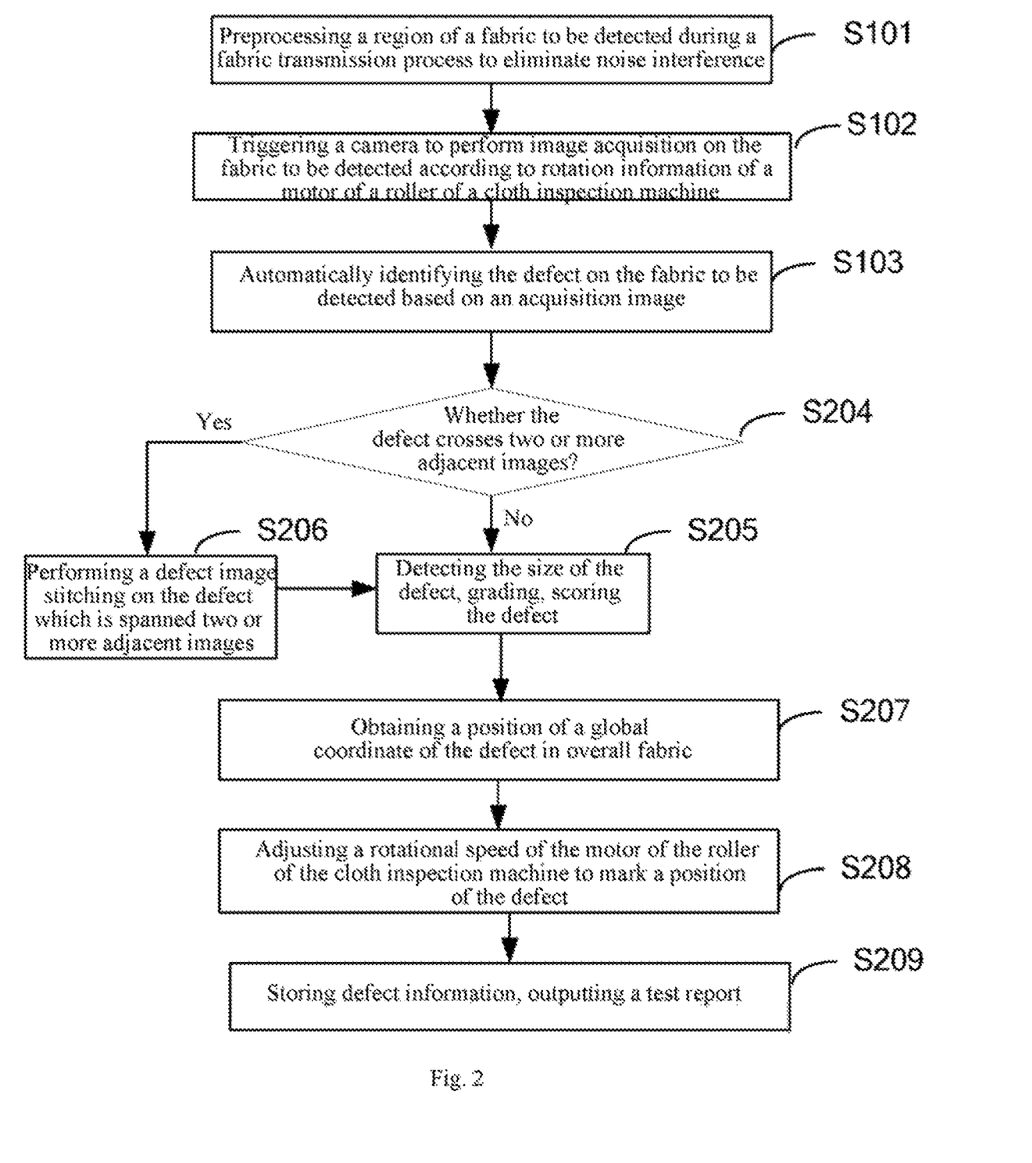
FIG. 2 is another flowchart of a method for automatically detecting fabric defect according to an embodiment of the present disclosure.

FIG. 2 is another flowchart of a method for automatically detecting fabric defect according to an embodiment of the present disclosure. In addition to steps shown in FIG. 1, the method of the embodiment includes more improved features, and provides a more complete method for automatically detecting defect. The method shown in FIG. 2 includes: step S101, the region of the fabric to be detected is preprocessed during a fabric transmission process by a noise removing device, noise interference is eliminated during a detection process. Next, in step S102, according to the rotation information of the roller motor of the cloth inspection machine, the camera is triggered to perform image acquisition of the fabric to be detected. Then, in step S103, based on the acquisition image, the defects on the fabric to be detected are automatically identified. When the defect is identified, in step S204, whether the defect is crossed two or more adjacent images is determined. If the judgment result is yes, in step S206, a defect image stitching is performed on the defect which is spanned two or more adjacent images. If the judgment result is no, the step S205 is proceeded directly to detect the size of the defect, and grade, score, etc., of the defect. It is worth mentioning that the grading and scoring of the defect may be performed according to characteristics of the defect. The characteristics of the defects includes but not limited to a length of the defect, a size of the defect region, a direction of the defect, a unit code length density at which the defect is occurred, etc. Measuring the size of the defect and evaluating grading of each of detected defects may further include that a type of defect is determined.

In the method, preferably, it may further include that, in step S207, a position of the global coordinate of the defect in overall fabric is obtained. For example, by obtaining a local coordinate of the defect on a sampling picture, the size of the defect region, the length of the defect, and the direction of the defect, a global vertical coordinate of the defect in the overall fabric is obtained according to the rotation information of the motor of the roller of the cloth inspection machine. A global horizontal coordinate of the defect in the overall fabric is obtained according to a number of the camera corresponding to the sampling picture. Thereby, a position of the global coordinate of the defect is obtained. Thereby, the position of the defect is accurately marked according to the position of the global coordinate of the defect in the overall fabric.

Next, in step S208, a rotational speed of the motor of the roller of the cloth inspection machine is adjusted to reduce a fabric transmission speed. The position of the detected defect is marked on the fabric by a defect marking device, and when marking the position of the position of the detected defect is completed, the rotational speed of the roller motor of the cloth inspection machine is increased to restore the fabric transmission speed. The marking the position of the defect may, according to the position of global coordinate of the defect in the overall fabric, control the defect marking device to translate laterally above the defect to mark the defect, and a longitudinal moving speed of the defect marking device is matched with the fabric transmission speed. Alternatively, the marking the position of the defect may further, according to the position of the global coordinate of the defect in the overall fabric, control the defect marking device to locate an edge of the fabric corresponding to the identified defect, and mark the edge of the fabric. In this alternative proposal, the defect marking device is not translated.

Further, the noise removing device used in the method of the present disclosure may include a blowing device and a cleaning device. An air outlet speed and strength of the blowing device may be adjusted according to the characteristics of the fabric to be detected. The characteristics of the fabric include but not limited to fabric color, fabric pattern, fabric fiber degree and fabric structure. And the cleaning device can be adjusted to control a tightness degree or a height of a gap between a cleaning surface of the cleaning device and a surface of the fabric in contact with each other. The cleaning surface includes but not limited to a fibrous tissue, a brush, a sponge, and the like.

In step S209, identified information of the defect of the fabric may be stored. Stored defect information includes but not limited to a defect grade, a defect score, a local coordinate of the defect, a global coordinate of the defect, a storage path of a defect original image, a storage path of a defect detection image, an overall detection score of the fabric, a detection code length of the fabric, and an average score of a unit code length, etc. Finally, a detection report of the fabric to be detected may be automatically generated and output.

The above description according to FIG. 1 and FIG. 2 is merely exemplary embodiments. The above steps are not necessarily performed in order, and steps may be added according to actual needs or unnecessary steps may be reduced from the above steps.

The system for automatically detecting fabric defect of the present disclosure will be described by manner of providing examples combined with FIG. 3 as below.

Figure 3:
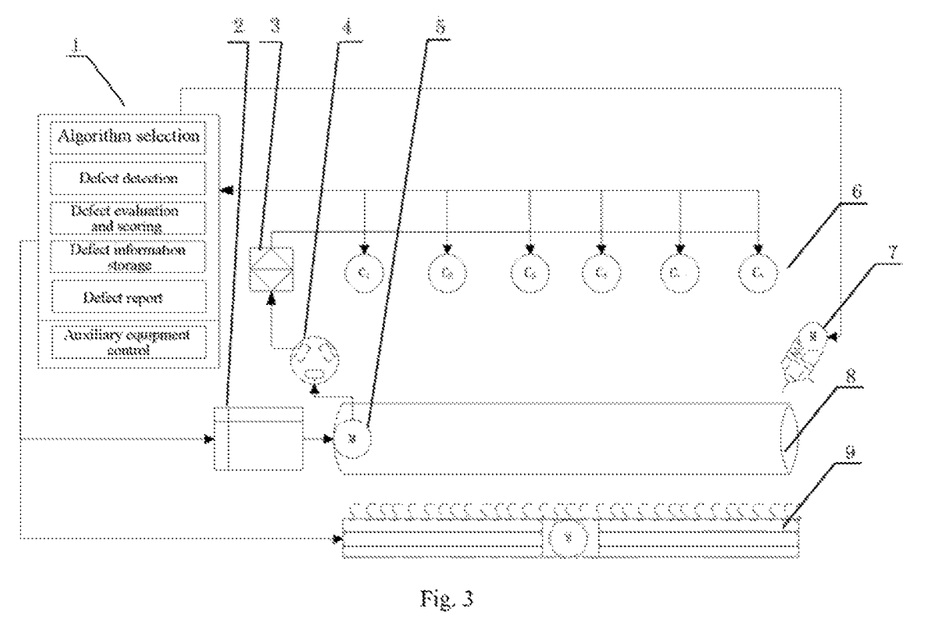
FIG. 3 is a schematic diagram of an overall arrangement of a system for automatically detecting fabric defect according to an embodiment of the present disclosure.

FIG. 3 is a schematic diagram of an overall arrangement of a system for automatically detecting fabric defect according to an embodiment of the present disclosure. The system includes a noise removing device 9 configured to preprocess the region of the fabric to be detected during the fabric transmission process to eliminate noise interference during the detection process. A camera 6 may include N cameras (C1 . . . CN), where N is greater than or equal to 1, and be configured to trigger to perform image acquisition on fabric to be detected according to the rotation information of a motor 5 of a roller 8 of the cloth inspection machine. And a defect recognition device 1 is configured to automatically identify the defect on the fabric to be detected based on the acquisition image. The system of the present disclosure further includes a defect marking device 7. When the defect marking device 1 identifies the defect, the rotation speed of the motor 5 of the roller 8 of the cloth inspection machine is decreased to reduce the fabric transmission speed. Marking is performed with the position of the detected defect on the fabric by the defect marking device 7. When the marking of position of the detected defect is completed, the rotation speed of the motor 5 of the roller 8 of the cloth inspection machine is increased to restore the fabric transmission speed.

The system may further perform a defect image stitching on the defect that is spanned two or more adjacent images, and obtain the position of the global coordinate of the defect in the overall fabric. By acquiring the local coordinate of the defect on a sampling picture, the size of the defect region, the length of the defect, and the direction of the defect, the global vertical coordinate of the defect in the overall fabric is obtained according to the rotation information of the roller motor 5 of the cloth inspection machine. And the global horizontal coordinate of the defect in the overall fabric is obtained according to the number of the cameras corresponding to the sampling picture. The defect marking device accurately marks the position of the defect according to the position of the global coordinate of the defect in the overall fabric.

The defect marking device 7 laterally translates above the defect to mark the defect according to the position of the global coordinate of the defect in the overall fabric, and a longitudinal moving speed of the defect marking device is matched with the fabric transmission speed. Here, the lateral direction refers to the direction perpendicular to the moving direction of the fabric on the plane of the fabric, and the longitudinal direction refers to the moving direction of the fabric. Alternatively, the defect marking device 7 may locates the edge of the fabric corresponding to the identified defect according to the position of the global coordinate of the defect in the overall fabric, and marks the edge of the fabric without translating the defect marking device 7 at the same time.

Further, the noise removing device 9 in the system of the present disclosure may include a blowing device and a cleaning device (not shown in the figure). Speed and strength of an air outlet of the blowing device may be adjusted according to the characteristics of the fabric to be detected. The characteristics of the fabric include but not limited to the fabric color, the fabric pattern, the fabric fiber degree and the fabric structure. And the cleaning device can be adjusted to control the tightness degree or the height of the gap between the cleaning surface of the cleaning device and the surface of the fabric in contact with each other. The cleaning surface includes but not limited to the fibrous tissue, the brush, the sponge, and the like.

The system may further include a defect grading device configured to grade and score the defect according to the defect characteristics. the defect characteristics includes but not limited to the length of the defect, the size of the defect region, the direction of the defect, the unit code length density at which the defect is occurred, and the like.

The system of the present disclosure further includes a database configured to store information on the identified fabric defect. The stored defect information includes but not limited to a defect grade, a defect score, a local coordinate of the defect, a global coordinate of the defect, a storage path of a defect original image, a storage path of a defect detection image, an overall detection score of the fabric, a detection code length of the fabric, and an average score of a unit code length, etc.

Finally, the system further includes a detection reporting device configured to automatically generate and output a detection report of the fabric to be detected. As an example, the defect recognition device, the defect grading device, the database, the detection report device, and the like may be implemented by a computer, a central controller, a processor, a microprocessor, or the like.

In the following, by a specific embodiment, the structure of the system and working principle of the present disclosure will be explained in more detail. It should be understood that any components or elements in the example are not necessary or irreplaceable unless otherwise stated, and the embodiment is only to assist in understanding the present disclosure and should not be construed as limiting the present disclosure.

In the specific embodiment, for convenience of description, the system for automatically detecting fabric defect is divided into three parts including a fabric noise removal subsystem, a fabric defect detection subsystem and a defect automatic marking subsystem.

The fabric noise removal subsystem includes the blowing device and the cleaning device. The fabric noise removal subsystem may be controlled by the central control computer according to the detection process, and may further be controlled to perform separate start and stop. Secondary pollution such as dust, yarn breakage, fibers, and other external interference factors attached to the fabric surface may be eliminated by the fabric noise removal subsystem, thereby improving the accuracy of detection.

Still referring to FIG. 3, the defect detection subsystem includes one or more cameras 6, an encoder 4, a flip flop 3, and a central control computer 1. The defect detection subsystem is an important part of the system of the present disclosure, and is divided into two parts including defect detection and auxiliary device control. The defect detection subsystem, the fabric noise removal subsystem and the defect automatic marking subsystem are collaboratively working and are controlled by the central control computer.

The defect automatic marking subsystem includes a frequency converter 2, a defect marking device 7, and a translation motor. The defect automatic marking subsystem accurately marks the position of the defect on the fabric according to the type and coordinate of the defect detected by the defect detection subsystem.

When the fabric defect automatic detecting system of the present disclosure is working, as shown in FIG. 3, the fabric is transmitted by the roller 8 for transmission of the cloth inspection machine. The central control computer 1 starts the noise removal subsystem and the camera system 6. The noise removal subsystem 9 may start and stop separately during the fabric transmission process only to ensure that the detected fabric region passes through the noise removal subsystem. The noise removal subsystem 9 removes interference factors which include but not limited to dust, yarn breakage, fibers, etc., attached to the surface of the fabric by means of the blowing device and the cleaning device to ensure that the surface of the fabric is clean and authentic. The blowing device may adjust the output wind speed in combination with the characteristics of the detected fabric. The cleaning device may control the degree of tightness (or gap height) in contact with the surface of the fabric by adjustment. The encoder 4 samples a rotation distance of the motor 5 of the roller of the cloth inspection machine in real time, and the output distance recorded by the encoder 4 includes a total accumulated distance and a single cumulative distance. When the single cumulative distance of the encoder 4 reaches a set trigger distance value, the encoder 4 sends a signal to the trigger 3 which triggers the camera 6 to capture the fabric picture. After the encoder 4 outputs the signal, the single cumulative distance is reset to zero, and the total accumulated distance remains unchanged. The number of the camera 6 started N may be set according to the width of the fabric, and it is necessary to ensure that the combination of pictures taken by the started camera covers the overall width of the fabric. The image of the fabric captured by the camera 6 is transmitted to the defect detection subsystem of the central control computer 1.

The defect detection subsystem selects the corresponding defect detection algorithm according to the set type of the fabric, at first. The defect detection algorithm is pre-integrated in the defect detection subsystem. The types of the fabric include but are not limited to the fabric color, the fabric pattern, the fabric fiber degree, the fabric structure, and the like. Then, the sampling picture is analyzed for defect detection according to selected defect detection algorithm. If there is a defect in the sampling picture, the coordinate of the defect in the sampling picture is acquired, that is, the local coordinate (x, y) is obtained, and the original sampling picture and the detected defect picture are stored. According to the defect information including but not limited to the length of the defect, the size of the defect region, the direction of the defect, and the density of the unit code length of the defect, the defect is graded and scored to enter a subsequent automatic detection process. If there is no defect, the sampling picture does not perform any subsequent operations. The type of the defect may be evaluated and scored by a four-point or ten-point standard, and the local coordinate (x, y) of the defect is converted to the global coordinates (X, Y) on the overall fabric. According to the score of signal defect, a total score of the fabric and statistical information about the average score of the code length, etc., is generated.

The database is used to store information for each of detected fabrics, which includes but not limited to the defect level, the defect point, the local coordinate of the defect, the global coordinate of the defect, the storage path of the original defect picture, the storage path of the defect detection picture, the overall detection score of the fabric, the code length of the fabric detection, and the average unit length of the code, etc. A fabric inspection report is generated according to the stored fabric inspection information, and a paper report may be printed by the printer.

Based on the detection result of automatic detecting defect subsystem, if the fabric defect is detected during the detection process, the central control computer sets a low frequency value to the frequency converter 2, reducing the rotation speed of the motor of the roller of the cloth inspection machine, thereby reducing the speed of the fabric transfer, and ensuring that the defect marking device is translated above the defect and then performing the defect marking operation. The defect marking device may further perform the marking only at the edge of the fabric without translating. After the defect marking is completed, the central control computer sets a high frequency value to the inverter, and increases the rotation speed of the motor of the roller of the cloth inspection machine to ensure the fabric detection speed.

When the defect detection system of the embodiment starts to operate, firstly, the cloth inspection machine roller motor 5 is started. The roller 8 of the cloth inspection machine rotates, and the fabric is transmitted by the roller 8. The distance at which the roller motor 5 of the cloth inspection machine rotates is sampled in real time by the encoder 4. When the distance accumulated by the encoder 4 reaches a set trigger distance h, the encoder 4 outputs a pulse signal to the trigger 3. The single cumulative distance of the encoder 4 is reset to zero, and the overall cumulative distance remains unchanged. After the pulse signal is received by the trigger 3, the camera 6 is triggered to capture the fabric image by outputting a high level.

After the motor 5 of the roller of the cloth inspection machine is started, the noise removing device 9 will be started. The noise removing device 9, as shown in FIG. 3, includes a blowing device 9_1 (not shown) and a cleaning device 9_2 (not shown). The output wind speed of the blowing device 9_1 may be adjusted according to the characteristics of the fabric. The blowing device 9_1 may remove image interference factors such as dust, fibers, and yarn breakage attached to the surface of the fabric. The cleaning device 9_2 may further remove the interference factor with strong adhesion. A basis may be provided for the camera to capture high-quality real images by the working of the operation of the blowing device 9_1 and the cleaning device 9_2, thereby improving the accuracy of subsequent defect recognition.

The camera 6 may be composed of one or more cameras, ensuring that the combination of the picture sampled by the camera may cover the overall width of the fabric. The number of the camera 6 startups may be preset according to the actual fabric width, or may be automatically selected according to the image information captured by the camera, that is, if fabric information is provided in the image captured by the camera, the camera is started, otherwise the camera is paused for image capture.

The image information captured by the camera 6 is transmitted to the central control computer 1 through the camera-specific transmission protocol. After the central control computer 1 receives the image information transmitted by the camera 6, firstly, the central control computer 1 selects a detection algorithm according to the characteristics of the fabric. The characteristics of the fabric include, but are not limited to, fabric color, fabric pattern, fabric material and the like. All detection algorithms are pre-integrated into the inspection software system. Then, the sampling picture is analyzed for defect detection according to the selected defect detection algorithm. If there is a defect, the local coordinate (x, y) of the defect on the sampled picture is determined, and the size of the defect region is counted, and the length of the defect is determined, and the linear defect may further be set to determine the direction of the defect. The global coordinate Y of the defect in the overall fabric is obtained according to the total cumulative distance of the encoder 4. The global horizontal coordinate X of the defect in the overall fabric is obtained according to the camera number to which the sampling picture belongs, thereby obtaining the position of the global coordinate (X, Y) of the defect in the overall fabric. The original picture and the detection picture to which the defect belongs are stored according to a preset storage path.

If the sampled picture size is Wmm×Hmm, the current sampling picture is captured by an mth camera. The trigger number of the trigger is n. the global coordinate and the local coordinate of the defect satisfy the following relationship.

$$X=W*(m-1)+x;$$

$$Y=H*(n-1)+y;$$

The type of defect is evaluated and scored by the four-point or the ten-point standard. According to the score of the single defect, the total score of the fabric and statistical information about the average score of the code length, etc., is generated. Taking the four-point system as an example, the defect type and corresponding score are as follows.

| Defect type | Defect score |
| --- | --- |
| Class I | 1 point |
| Class II | 2 points |
| Class III | 3 points |
| Class IV | 4 points |

If the number of defects is N and the type of each of the defects is Ti, the total score P of the fabric satisfies following.

$$P = \sum_{T_i \in I} 1 + \sum_{T_i \in II} 2 + \sum_{T_i \in III} 3 + \sum_{T_i \in IV} 4$$

If the total code length of the fabric is L, the average score for detecting the code length is as following.

$$P_{avg} = \frac{P}{L}$$

The database is configured to store information for each of the detected fabrics, which includes but not limited to the defect level, the defect point, the local coordinate of the defect, the global coordinate of the defect, the storage path of the original defect picture, the storage path of the defect detection picture, the overall detection score of the fabric, the code length of the fabric detection, and the average unit length of the code.

A fabric inspection report is generated according to the stored fabric inspection information, and a paper report may be printed by the printer.

For the sampling picture, if the defect is detected, the central control computer 1 reduces the rotational speed of the roller motor 5 of the cloth inspection machine by setting a lower frequency value of the frequency converter 2, thereby reducing the transmission speed of the fabric. The central control computer 1 controls the defect marking device 7 to laterally translate to the global coordinate X of the defect, and controls the defect marking device 7 to locate the detected defect (X, Y) for the defect marking. The defect marking device 7 may further not be translated, and only needed to locate the defect marking device 7 to the global ordinate Y of the detected defect to mark the edge of the fabric. Marking methods include, but are not limited to, fluorescent labels, label paper labels, and the like.

Optionally, the system may operate in fully automated and interactive mode.

Figure 4:
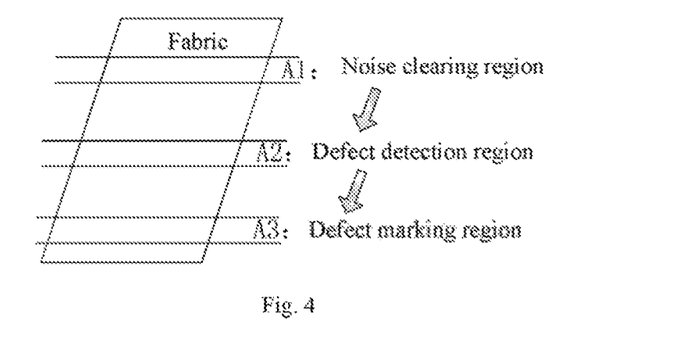
FIG. 4 is a schematic diagram of a distribution of cloth regions processed by each of subsystems in a system for automatically detecting fabric defect according to an embodiment of the present disclosure.

In the embodiment, the processing region distribution of the noise removal subsystem, the defect detection subsystem, and the defect automatic marking subsystem in the defect detection system of the present disclosure during the fabric transmission process is shown in FIG. 4.

Through the noise removal subsystem, the noise factors such as fibers, small yarns, dust and the like may be eliminated. Therefore, a clean image may be obtained for subsequent processing. If there is no noise filtering device, the captured image may be unreliable due to contamination, resulting in false alarms. The noise removal subsystem ensures high-quality fidelity pictures captured by the camera, providing a basis for the defect detection subsystem and reducing the impact of noise factors on the detection results. The detection result of the defect detection subsystem provides an accurate coordinate reference for the defect automatic marking subsystem, so that the defect may be accurately marked, and provides important guidance and reference significance for subsequent cutting.

The automatic detection method based on computer vision image may effectively eliminate the defects of low detection efficiency, high missed detection rate and unsuitable for long-term continuous operation, etc., so that may greatly improve the detection speed under the premise of ensuring the detection precision, thereby improving the overall fabric inspection efficiency. In addition, in the automatic detection process based on computer vision image, noise elimination, defect detection, scoring and storage, and defect marking are automatically completed, so that one operator may manage a plurality of automatic inspection systems, greatly reducing the labor cost of the factory.

A fabric defect automatic detection device according to the present disclosure may include a memory and a controller. In the embodiment, the controller is configured to perform the method as described above.

According to the present disclosure, a computer readable storage medium having a computer program stored thereon is further provided. The computer program is executed to implement the method as described above.

The various embodiments of the present application may be implemented by software or by hardware. Those skilled in the art may understand that all or part of the steps of the above-described embodiments may be implemented as a computer program or instructions performed by a CPU. The above-described functions defined by the above-described methods provided by the present disclosure are performed when the computer program is performed by the CPU. The program may be stored in a computer readable storage medium, which may be a read only memory, a magnetic disk or an optical disk, or the like.

The system of the present disclosure can effectively solve the defects of low accuracy, high detection rate, repeated work and high strength of the artificial fabric defect detection. The method of the present disclosure can effectively improve the accuracy of defect detection to ensure that the detection operation can be continued for a long time, and the automatically generated defect detection report can be used as a basis for subsequent fabric cutting.

The present disclosure is described according to the specific embodiments, but it should be understood to those skilled in the art that various changes and equivalents may be made without departing from the scope of the disclosure. In addition, many modifications may be made to the present disclosure without departing from the scope of the invention to accommodate particular occasions or materials of the disclosed technology. Therefore, the present disclosure is not limited to the specific embodiments disclosed herein, and includes all the embodiments falling within the scope of the claims.

What is claimed is:

1. A method for automatically detecting fabric defect, comprising:
   preprocessing a region of a fabric for defect detection during a fabric transmission process by a noise removing device;
   triggering a camera to capture one or more images of the fabric for defect detection according to rotation information of a roller of a cloth inspection machine; and
   automatically identifying a defect on the fabric based on the one or more images of the fabric.

2. The method according to claim 1, further comprising, when the defect is identified, adjusting a rotational speed of the roller of the cloth inspection machine to reduce a fabric transmission speed; and marking a position of the detected defect on the fabric by a defect marking device.

3. The method according to claim 2, further comprising, obtaining a position of a global coordinate of the defect in the fabric, which comprises: obtaining a local coordinate of the defect on a sample picture, a size of a defect region, a length of the defect, and/or a direction of the defect; obtaining a global vertical coordinate of the defect in the fabric according to the rotation information of the roller of the cloth inspection machine; obtaining a global horizontal coordinate of the defect in the fabric according to a number of cameras corresponding to the sampling picture; and marking a position of the defect according to the position of the global coordinate of the defect in the overall fabric.

4. The method according to claim 3, wherein the marking the position of the defect further comprises: according to the position of the global coordinate of the defect in the fabric, controlling the defect marking device to locate an edge of the fabric corresponding to an identified defect, and marking the edge of the fabric without translating the defect marking device.

5. The method according to claim 1, wherein, the automatically identifying the defect on the fabric to be detected further comprises, performing a defect image stitching on the defect which is spanned two or more adjacent images.

6. The method according to claim 1, wherein the noise removing device comprises a blowing device and a cleaning device.

7. The method according to claim 1, further comprising, grading and scoring the defect according to the characteristics of the defect which comprises a length of the defect, a size of the defect region, a direction of the defect, and/or a unit code length density at which the defect is located, and the like.

8. The method according to claim 7, further comprising, storing information of the defect of the fabric, wherein the information comprises a defect grade, a defect point, a local coordinate of the defect, a global coordinate of the defect, a storage path of an original image, a storage path of a defect detection image, an overall detection score of the fabric, a detection code length of the fabric, and/or an average score of a unit code length.

9. The method according to claim 1, further comprising, automatically generating and outputting a detection report of the fabric.

10. A fabric defect automatic detection device, comprising a memory and a controller, wherein the controller is configured to perform the method according to claim 1.

11. A computer readable storage medium having a computer program stored thereon, wherein the computer program is executed to implement the method according to claim 1.

12. A system for automatically detecting fabric defect, comprising:
- a noise removing device, configured to preprocess a region of a fabric for defect detect ion during a fabric transmission process;
- a camera, configured to be triggered to capture one or more images off the fabric to be detected according to rotation information of a roller of a cloth inspection machine; and
- a defect recognition device, configured to automatically identify a defect on the fabric based on the one or more captured images.

13. The system according to claim 12, further comprising a defect marking device configured to identify the defect, decrease a rotation speed of the roller of the cloth inspection machine to reduce a fabric transmission speed, and mark a position of the detected defect on the fabric.

14. The system according to claim 13, wherein, the defect recognition device is further configured to obtain a position of a global coordinate of the defect in the fabric, by obtaining a local coordinate of the defect on a sample picture, a size of a defect region, a length of the defect, and/or a direction of the defect; obtain a global vertical coordinate of the defect in the fabric according to the rotation information of the roller of the cloth inspection machine; obtain a global horizontal coordinate of the defect in the fabric according to a number of cameras corresponding to the sample picture; and the defect marking device is further configured to mark a position of the defect according to the position of the global coordinate of the defect in the fabric.

15. The system according to claim 14, wherein, the defect marking device is configured to locate an edge of the fabric corresponding to an identified defect according to the position of the global coordinate of the defect in the fabric, and mark the edge of the fabric without translating the defect marking device at the same time.

16. The system according to claim 12, wherein, the defect recognition device is further configured to perform a defect image stitching on the defect which is spanned two or more adjacent images.

17. The system according to claim 12, wherein, the noise removing device comprises a blowing device and/or a cleaning device.

18. The system according to claim 12, further comprising a defect grading device, configured to grade and score the defect according to characteristics of the defect comprising a length of the defect, a size of a defect region, a direction of the defect, and/or a unit code length density at which the defect is located.

19. The system according to claim 12, further comprising a database, configured to store information of the identified defect of the fabric, the stored defect information comprising a defect level, a defect point, a local coordinate of the defect, a global coordinate of the defect, a storage path of an original image, a storage path of a defect detection image, an overall detection score of the fabric, a detection code length of the fabric, and/or an average score of a unit code length.

20. The system according to claim 12, further comprising a detection reporting device, configured to automatically generate and output a detection report of the fabric.

* * * * *